(12) United States Patent
Ueno

(10) Patent No.: US 7,821,729 B2
(45) Date of Patent: Oct. 26, 2010

(54) STORAGE APPARATUS AND METHOD FOR PROCESSING RECORDING COMPENSATION

(75) Inventor: Hiroaki Ueno, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 190 days.

(21) Appl. No.: 12/193,331

(22) Filed: Aug. 18, 2008

(65) Prior Publication Data

US 2009/0086361 A1 Apr. 2, 2009

(30) Foreign Application Priority Data

Sep. 28, 2007 (JP) ............... 2007-255196

(51) Int. Cl.
*G11B 5/09* (2006.01)
(52) U.S. Cl. .......................... 360/39; 360/46
(58) Field of Classification Search ............. 360/46, 360/65, 69, 39
See application file for complete search history.

(56) References Cited

U.S. PATENT DOCUMENTS 6,052,248 A * 4/2000 Reed et al. ............... 360/53
6,633,444 B2 * 10/2003 Uno et al. ............... 360/46
6,728,051 B2 * 4/2004 Igarashi et al. ............. 360/51
2002/0105744 A1 8/2002 Ueno

FOREIGN PATENT DOCUMENTS

| JP | A 7-6306 | 1/1995 |
| JP | A 2000-20903 | 1/2000 |
| KR | 10-2007-0054610 | 5/2007 |

* cited by examiner

*Primary Examiner*—Daniell L Negrón
*Assistant Examiner*—Regina N Holder
(74) *Attorney, Agent, or Firm*—Greer, Burns & Crain, Ltd.

(57) ABSTRACT

According to an aspect of an embodiment, a storage apparatus has a storage for storing a plurality of compensation values in association with a plurality of bit sequence patterns, a head for writing data into a medium and a controller for controlling the apparatus and driving the head, the controller determining whether to use one of the compensation values to drive the head to write an instantaneous data bit in dependence upon the immediate preceding data bits in reference to the bit sequence patterns.

12 Claims, 10 Drawing Sheets

FIG. 3

| Bit N-2 (312) | Bit N-1 (314) | Bit N (316) | Bit N Compensation (318) |
|---|---|---|---|
| + | 0 | − | T(+0−) (322) |
| − | 0 | + | T(−0+) (324) |
| 0 | + | − | T(0+−) (326) |
| 0 | − | + | T(0−+) (328) |
| + | − | + | T(+−+) (330) |
| − | + | − | T(−+−) (332) |

FIG. 7

| Bit N-2 | Bit N-1 | Bit N | Bit N Compensation |
|---|---|---|---|
| + | 0 | − | T(101) + ΔT(101) |
| − | 0 | + | T(101) − ΔT(101) |
| 0 | + | − | T(011) + ΔT(011) |
| 0 | − | + | T(011) − ΔT(011) |
| + | − | + | T(111) + ΔT(111) |
| − | + | − | T(111) − ΔT(111) |

312 — Bit N-2
314 — Bit N-1
316 — Bit N
318 — Bit N Compensation
722, 724, 726, 728, 730, 732

FIG. 8A

| 2T [NRZI] | 2T [0000101] | | 2T [1110101] | |
|---|---|---|---|---|
| [NRZ] | [0000110] | [1111001] | [0100110] | [1011001] |
| NLTS [%] | 2.3817 | -4.1256 | 0.2129 | -4.3668 |

812 — 2T [NRZI] column
813 — [NRZ] row
814 — 2T [0000101]
815 — NLTS [%] row
816 — 2T [1110101]

FIG. 8B

| Dibit [NRZI] | Dibit [0000011] | | Dibit [1110011] | |
|---|---|---|---|---|
| [NRZ] | [0000010] | [1111101] | [0100010] | [1011101] |
| NLTS [%] | -6.4035 | -8.2875 | -7.0273 | -9.0421 |

FIG. 8C

| Tribit [NRZI] | Tribit [1110101] | Tribit [0000111] | | Tribit [1110111] | |
|---|---|---|---|---|---|
| [NRZ] | [1111010] | [0000101] | [1011010] | [0100101] | |
| NLTS [%] | -7.69 | -10.636 | -4.9621 | -6.7421 | |

832 — 834 — 836

813 — 815

STORAGE APPARATUS AND METHOD FOR PROCESSING RECORDING COMPENSATION

BACKGROUND

The present technique relates to control devices, storage devices, LSIs, and recording compensation methods for detecting patterns that causes nonlinearity on the basis of the presence or absence of magnetization inversion and performing recording compensation in accordance with the patterns.

With the development of high-density magnetic recording/reproducing apparatuses and the increase in data transmission speed, nonlinear transition shift (NLTS) occurs in magnetic heads, recording media, and recording/reproduction transmission systems. Recording compensation techniques for reducing such NLTS are known. In a recording compensation technique, write pre-compensation, patterns which cause nonlinearity, such as dibit, tribit, and 2T are detected. And a recording compensation is performed in accordance with the detected patterns.

In a recording compensation technique, NRZ (non-return-to-zero) code representing data code to be recorded on a medium in the form of levels is measured. The NRZ code is then converted into the NRZI (non-return-to-zero inverted) format representing the recording code in accordance with the inversion of levels. From the NRZI code, a pattern such as dibit, tribit, or 2T that causes nonlinearity is detected. For example, when magnetization inversion occurs, NRZI bit values of two preceding bits are detected. When the detected NRZI bit values are "011", the pattern is defined as "dibit". When the NRZI bit values are "111", the pattern is defined as "tribit". When the NRZI values are "101", the pattern is defined as "2T". Then recording compensation is performed using recording compensation values corresponding to these patterns. Note that in NRZI coding in this example, "0" indicates the absence of magnetization inversion, and "1" indicates the presence of magnetization inversion.

Techniques of the related art are disclosed in Japanese Laid-open Patent Publication No. 07-6306 and Japanese Laid-open Patent Publication No. 2000-20903.

SUMMARY

According to an aspect of an embodiment, a storage apparatus has a storage for storing a plurality of compensation values in association with a plurality of bit sequence patterns, a head for writing data into a medium and a controller for controlling the apparatus and driving the head, the controller determining whether to use one of the compensation values to drive the head to write an instantaneous data bit in dependence upon the immediate preceding data bits in reference to the bit sequence patterns.

BRIEF DESCRIPTION OF THE DRAWINGS

FIG. 3 illustrates a recording compensation value table of the magnetic disk device according to the first embodiment;

FIG. 7 illustrates a recording compensation value table of the magnetic disk device according to the second embodiment; and FIGS. 8A, 8B and 8C illustrate a known technique.

DESCRIPTION OF THE PREFERRED EMBODIMENTS

With the recent advance in recording density and high-speed transmission, NLTS may change depending on the polarities of the individual patterns of dibit, tribit, and 2T. As illustrated in FIGS. 8A, 8B and 8C, "0000010" and "1111101" are both dibit patterns, but the polarities of the patterns are different. Consequently, different NLTS values corresponding to these patterns are obtained. In this way, in the conventional recording compensation technique, recording compensation is performed regardless of the polarities of patterns. This degrades the precision of recording compensation. FIG. 8A shows 2T[NRZI] 812, 2T[0000101] 814, 2T[1110101] 816, [NRZ] 813 and [NLTS] 815. FIG. 8B shows Dibit[NRZI] 822, Dibit [0000011] 824, Dibit [1110011] 826, [NRZ] 813 and [NLTS] 815. FIG. 8C shows Tribit[NRZI] 832, Tribit [0000111] 834, Tribit [1110111] 836, [NRZ] 813 and [NLTS] 815.

In the following, embodiments of the present technique will be described with reference to the accompanying drawings. A control device, a storage device, an LSI, and a recording compensation method according to the following embodiments of the present technique detect a pattern which causes nonlinearity on the basis of the presence or absence of magnetization inversion and perform recording compensation in accordance with the pattern.

First Embodiment

An outline and features of a magnetic disk device according to the first embodiment will be described. Then, a configuration and operation of the magnetic disk apparatus, and further, the effect of the first embodiment will be described. Note that the magnetic disk device in the following description is an example of a storage device. Accordingly, the present technique can be applied to other storage devices such as a magneto-optical disk.

Figure 1:
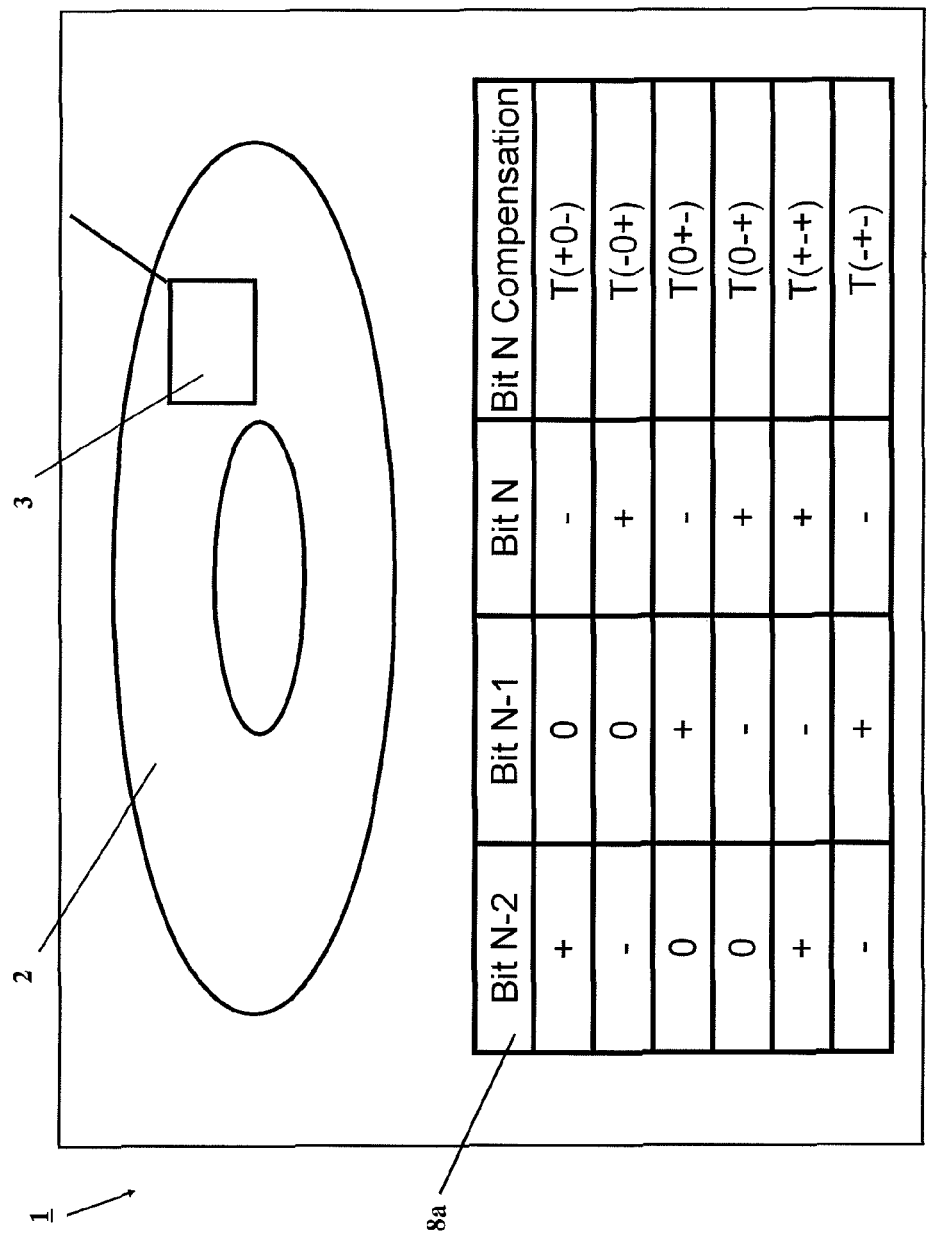
FIG. 1 illustrates an outline and features of a magnetic disk device according to a first embodiment.

Outline and Features of Magnetic Disk Device:

First, referring to FIG. 1, an outline and features of a magnetic disk device according to the first embodiment will be described.

A magnetic disk device 1 of the first embodiment detects a pattern that causes nonlinearity on the basis of the presence or absence of a magnetization inversion and performs recording compensation in accordance with the pattern. The main feature of this magnetic disk device 1 is that magnetic disk device 1 performs recording compensation taking into account recording polarities and realizes highly precise recording compensation.

The magnetic disk device 1 has a recording compensation value table 8a for storing recording compensation values so as to be associated with corresponding polarities of patterns that cause nonlinearity.

The magnetic disk device 1 detects a pattern causing non-linearity and the polarities of the detected pattern. The magnetic disk device 1 converts NRZ data representing data code to be recorded on a medium in the form of levels into an NRZI pattern in which "0" indicates absence of magnetization inversion and "1" indicates presence of magnetization inversion. The magnetic disk device 1 further converts the NRZI pattern into an NRZI pattern including signs representing the polarities of the pattern (hereinafter referred to as a signed NRZI pattern). Then, when the magnetization is inverted (when a value in a signed NRZI pattern indicates "+" or "−"), the magnetic disk device 1 detects a bit pattern in the signed NRZI pattern which corresponds to a bit which indicate the presence of magnetization inversion and two bits immediately preceding the bit.

Subsequently, when the detected bit pattern in the signed NRZI pattern is stored in the recording compensation value table 8a, the magnetic disk device 1 performs recording compensation on the recording data using a recording compensation value corresponding to the bit pattern. In the example of FIG. 1, when the detected bit pattern in the signed NRZI is any one of "+0−", "−0+", "0+−", "0−+", "+−+", are "−+−", which are stored in the recording compensation value table 8a, the magnetic disk device 1 determines that recording compensation is necessary. Then, the magnetic disk device 1 reads the recording compensation value ("Bit N Compensation" in FIG. 1) from the recording compensation value table 8a to perform recording compensation.

In this way, the magnetic disk device 1 performs recording compensation taking into account recording polarities, enabling highly precise recording compensation processing.

Figure 2:
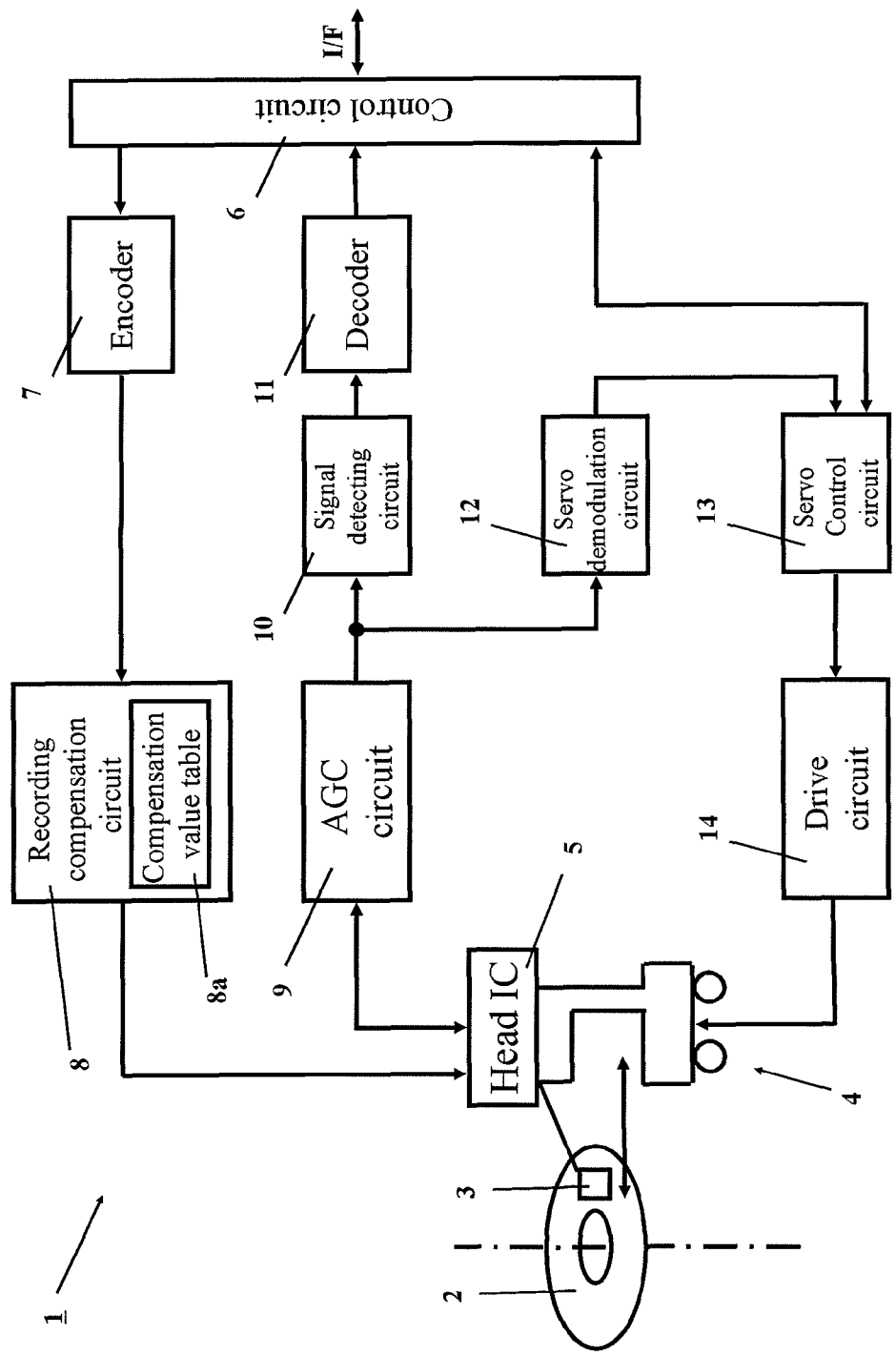
FIG. 2 is a block diagram illustrating a configuration of the magnetic disk device according to the first embodiment.

Configuration of Magnetic Disk Device:

Referring now to FIG. 2, a configuration of the magnetic disk device 1 in FIG. 1 will be described. FIG. 2 is a block diagram illustrating a configuration of the magnetic disk device 1 according to the first embodiment. As illustrated in FIG. 2, the magnetic disk device 1 generates a magnetic field in a magnetic head 3 by supplying a recording current to the recording head 3 disposed opposite to a magnetic disk 2 while rotating the magnetic disk 2. The magnetic disk 2 is a disk-shaped medium using a high retentive magnetic film and having tracks formed thereon. The magnetic disk device 1 writes data into the magnetic disk 2 by magnetizing the magnetic disk 2 in the tracking direction.

At this time, the magnetic head 3 is moved by an actuator 4 in a radial direction of the magnetic disk 2 to record data on the tracks concentrically formed on the magnetic disk 2. In addition, the magnetic head 3 receives a recording current from a head IC 5, and a magnetic field based on the recording data is generated. The recording data is initially supplied from an external source. The magnetic head 3 writes data into a medium for storing data.

A control circuit 6 receives recording data from the external source and supplies the recording data to an encoder 7. The encoder 7 converts the recording data supplied from the control circuit 6 into NRZ (non-return-to-zero) data to record the recording data on the magnetic disk 2. The encoder 7 supplies the NRZ data to a recording compensation circuit 8. Note that NRZ refers to a recording method which effects recording in a pulse waveform in which a bit unit interval is equal to the length of a pulse in a binary pulse stream.

The recording compensation circuit 8 has a recording compensation value table 8a for storing recording compensation values so as to be associated with corresponding polarities of patterns that cause nonlinearity. Referring now to FIG. 3, the recording compensation value table 8a is described in more detail. FIG. 3 shows "Bit N-2" 312, "Bit N-1" 314, "Bit N" 316 and Bit N Compensation 318. As illustrated in FIG. 3, the recording compensation value table 8a stores signed NRZI patterns subject to recording compensation, including "+0−", "−0+", "0+−", "0−+", "+−+", and "−+−" and corresponding recording compensation values "T(+0−)" 322, "T(−0+)" 324, "T(0+−)" 326, "T(0−+)" 328, "T(+−+)" 330, and "T(−+−)" 332. The recording compensation circuit 8 stores a plurality of compensation values in association with a plurality of bit sequence patterns.

The compensation value table 8a receives NRZ data from the encoder 7 as a recording signal and converts the NRZ data into an NRZI pattern in which "0" indicates the absence of magnetization inversion and "1" indicates the presence of magnetization inversion. The recording compensation value table 8a then converts the NRZI pattern into a signed NRZI pattern indicating the polarities of the NRZI pattern. In a signed NRZI pattern, "+" indicates magnetization inversion from "0" to "1", and "−" indicates magnetization inversion from "1" to "0".

Figure 4:
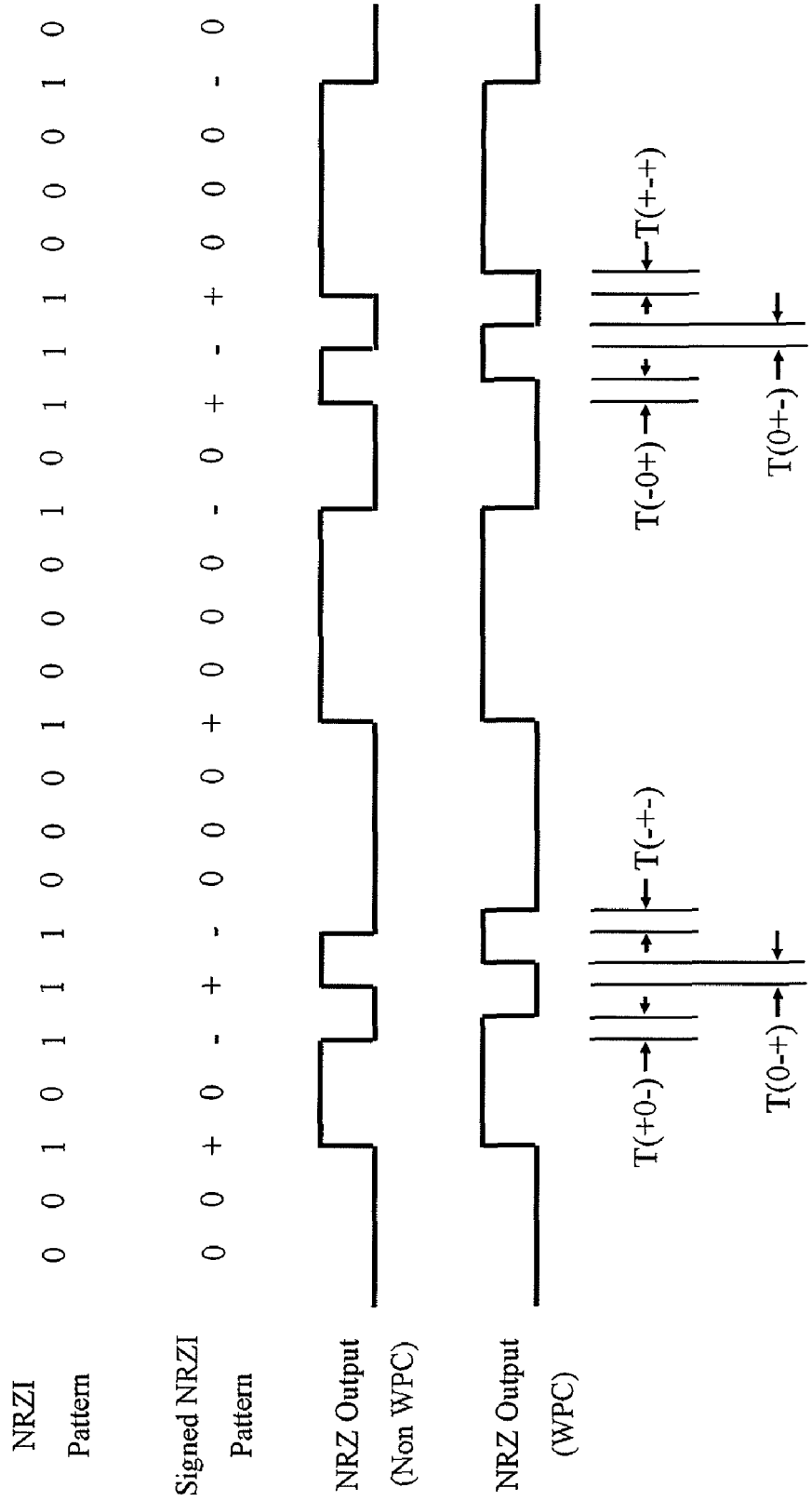
FIG. 4 illustrates recording compensation processing.

When the resultant signed NRZI pattern is stored in the recording compensation value table 8a, the recording compensation circuit 8 performs recording compensation for correcting the NRZ data using a recording compensation value corresponding to the signed NRZI pattern (see, FIG. 4). As shown in FIG. 4, a period of writing an instantaneous data bit length is changed on the basis of the recording compensation value table 8a. The period of writing the instantaneous data bit length when using one of the compensation values is longer than a period of writing the instantaneous data bit when not using one of the compensation values. When the resultant signed NRZI pattern is stored in the recording compensation value table 8a, a magnetic field of preceding bit enforces a magnetic field outputted from the magnetic head 3. Due to the enforced magnetic field, a recording position is out of a target position. To prevent the mistaken recording the recording compensation circuit 8 delays a period of writing the instantaneous data bit on the basis of the one of the compensation values.

When the instantaneous data bit is inverted and at least one of the two bits immediately preceding the instantaneous data bit is inverted, an instantaneous data bit length is changed on the basis of the recording compensation value table 8a. Meanwhile, when the instantaneous data bit is inverted and none of the two bits immediately preceding the instantaneous data bit is inverted, an instantaneous data bit length is not changed. And also when the instantaneous data bit is not inverted a period of writing an instantaneous data bit length is not changed.

Compared to the case when both of the two bits immediately preceding the instantaneous data bit are inverted, an instantaneous data bit length is longer when one of the two bits immediately preceding the instantaneous data bit is inverted. The reason is as below. When both of the two bits immediately preceding the instantaneous data bit are inverted, each of the conflicting polarities negates a magnetic effect each other.

The recording compensation circuit 8 supplies the corrected recording signal to the head IC 5.

When there is a bit indicating the presence of magnetization inversion, the recording compensation circuit 8 detects a bit pattern of the bit of magnetization inversion (i.e., a bit of "+" or "−" in the signed NRZI pattern) and two immediately preceding bits. Then, the recording compensation circuit 8 determines whether the detected bit pattern in the signed NRZI pattern is stored in the recording compensation value table 8a. When the bit pattern is stored in the recording compensation value table 8a, the recording compensation circuit 8 performs recording compensation on the recording data using the corresponding recording compensation value. A controller controls the apparatus and drives the magnetic head. The controller determines whether to use one of the compensation values to drive the head to write an instantaneous data bit in dependence upon the immediate preceding data bits in reference to the bit sequence patterns.

The head IC 5 provides the magnetic head 3 with a recording current corresponding to the recording data supplied from the recording compensation circuit 8. The signal reproduced by the magnetic head 3 is then supplied to the head IC 5 to be amplified and supplied to an AGC (automatic gain control) circuit 9. The AGC circuit 9 controls the amplitude of the signal supplied from the head IC 5 to be constant and outputs the signal.

The signal outputted from the AGC circuit 9 is supplied to a signal detecting circuit 10 for detecting reproduced data. The detected reproduced data is supplied to a decoder 11 to be decoded and supplied to a control circuit 6. The control circuit 6 outputs the reproduced data to an external device.

In addition, the signal output form the AGC circuit 9 is supplied to a servo demodulation circuit 12. The servo demodulation circuit 12 demodulates a servo signal supplied from the AGC circuit 9 and supplies the demodulated signal to a servo control circuit 13. In response to the servo signal supplied from the servo demodulation circuit 12 and a control signal supplied from the control circuit 6, the servo control circuit 13 generates a drive control signal in accordance with a difference between the present position of the magnetic head 3 and a target recording or reproducing position. The servo control circuit 13 then supplies the generated drive control signal to a drive circuit 14.

The drive circuit 14 generates a drive signal for driving the actuator 4 in accordance with the drive control signal supplied from the servo control circuit 13 and supplies the drive signal to the actuator 4. The actuator 4 is driven in accordance with the drive signal from the drive circuit 14 to move the magnetic head 3 to a predetermined position. When data is recorded on the magnetic disk 2 using this magnetic disk device 1, the magnetic disk 2 needs to be magnetized. Thus, the position of recorded data is deviated by the effect of the inversion of magnetization of preceding recorded data on a recording medium. Thus, the recorded data position is deviated from the actual position of magnetization inversion.

Figure 5:
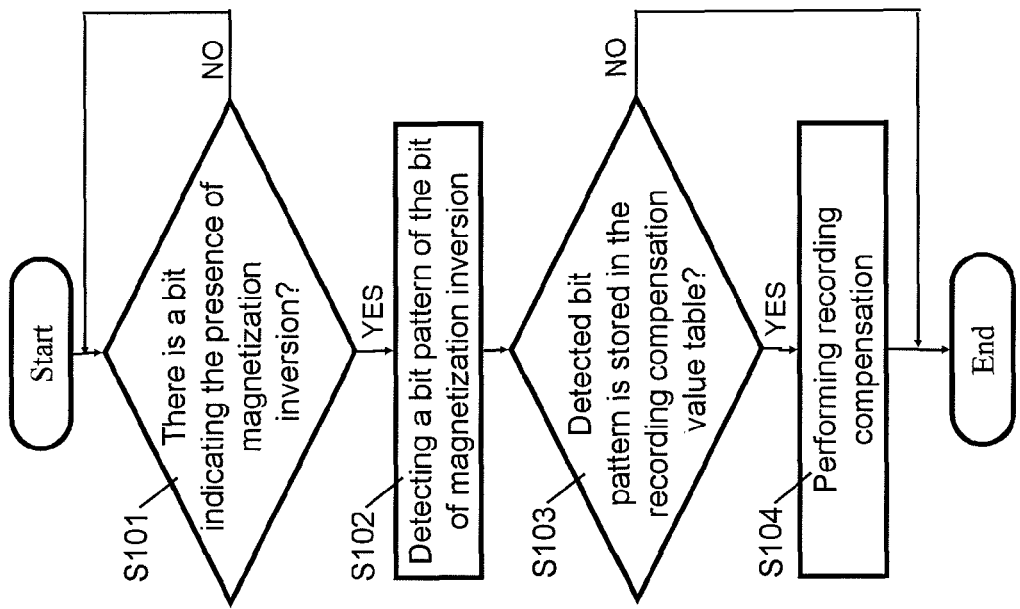
FIG. 5 is a flowchart illustrating operations performed by the magnetic disk device according to the first embodiment.

Recording Compensation of Magnetic Disk Device:

In the following, referring to FIG. 5, recording compensation processing performed by the magnetic disk device 1 according to the first embodiment will be described. FIG. 5 is a flowchart illustrating a processing procedure performed by the magnetic disk device 1 according to the first embodiment.

As illustrated in FIG. 5, when there is a bit indicating the presence of magnetization inversion (yes, in Step S101), the recording compensation circuit 8 detects a bit pattern of the bit of magnetization inversion and two immediately preceding bits in a signed NRZI pattern (Step S102).

Then, the recording compensation circuit 8 determines whether the detected bit pattern is stored in the recording compensation value table 8a (Step S103). If it is determined that the detected bit pattern is stored in the compensation value table 8a (yes, in Step S103), the recording compensation circuit 8 performs recording compensation on recording data (Step S104). When the detected bit pattern is not stored in the compensation value table 8a (no, in Step S103), the recording compensation circuit 8 terminates the processing procedure without performing recording compensation.

As described above, the magnetic disk device 1 performs recording compensation taking into account recording polarities to correct an NLTS which is dependent on the recording polarities in magnetic recording, and thus can realize highly precise recording compensation operation. In addition, a storage device capable of highly reliable operation with high recording density and high-speed transmission can be realized.

Second Embodiment

While an embodiment of the present technique has been described above, the present technique may be practiced in the form of a variety of other embodiments. Thus, in the following, one of such embodiments of the present technique will be described as the second embodiment.

Figure 6:
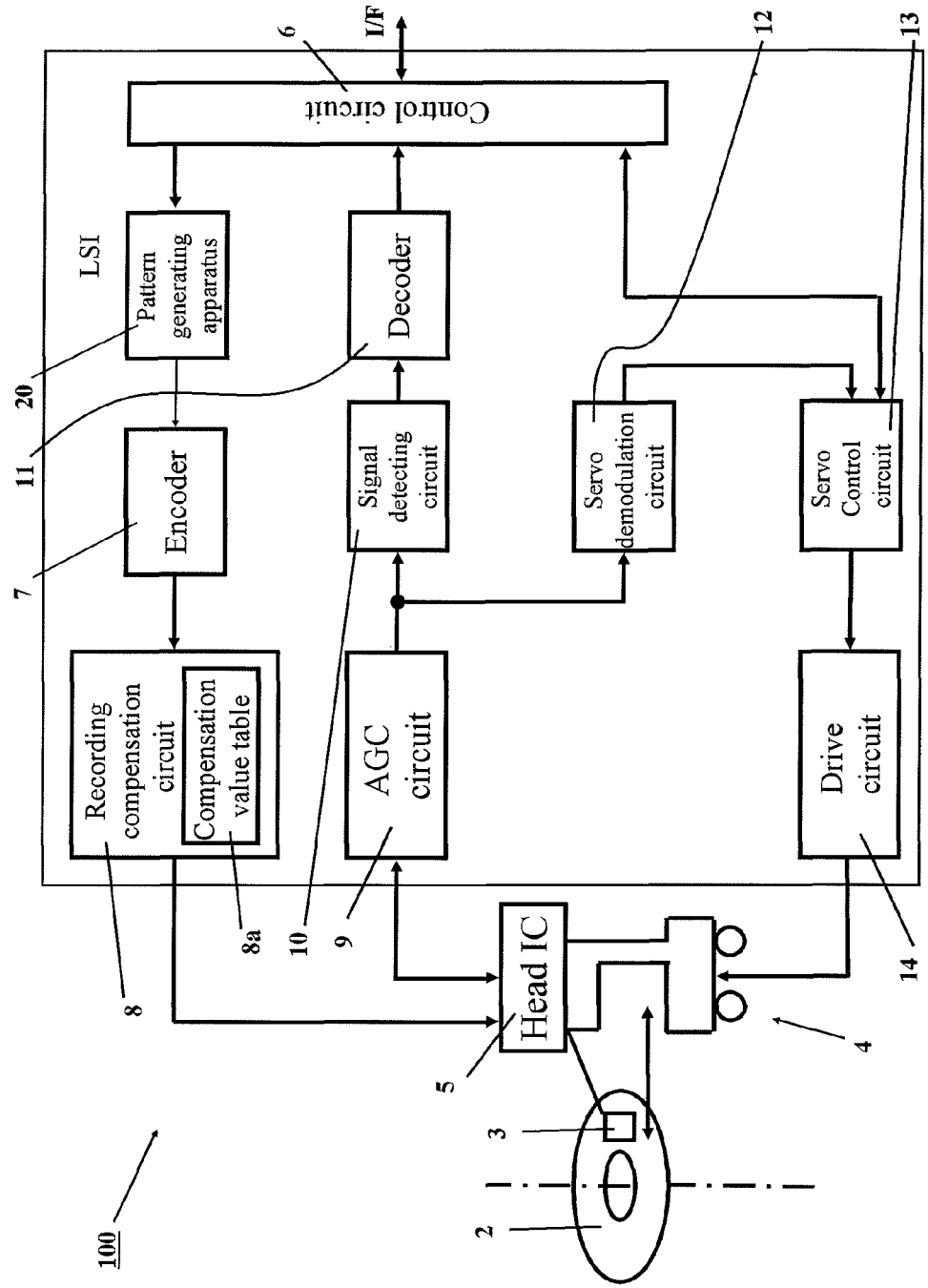
FIG. 6 is a block diagram illustrating a configuration of a magnetic disk device according to a second embodiment.

LSI:

The present technique may be applied to a write LSI (large scale integrated circuit) or a read/write channel LSI including at least an encoder, or to an LSI for recording/reproduction including a control circuit for an MCU (memory control unit), HDD (hard disk drive), etc. As illustrated in FIG. 6, a magnetic disk device 100 can be configured using an LSI 21 for recording and reproduction.

Recording Compensation Table:

In the first embodiment described above, recording compensation values stored in a compensation value table are absolute values. However, the present technique is not limited to this case, and it is also possible to obtain recording compensation values from differences between polarities. As illustrated in FIG. 7, a recording compensation value is calculated by adding or subtracting one-half of a difference between recording compensation values of opposite polarities corresponding to a pattern that causes nonlinearity (for example, a difference between WPC(+0−) and WPC(−0+)) to or from an average value of recording compensation values corresponding to the pattern causing nonlinearity (T(101), T(011), and T(111) in FIG. 7). FIG. 7 shows "Bit N-2" 312, "Bit N-1" 314, "Bit N" 316 and Bit N Compensation 318. As illustrated in FIG. 7, the recording compensation value table 8a stores signed NRZI patterns subject to recording compensation, including "+0−", "−0+", "0+−", "0−+", "+−+", and "−+−" and corresponding recording compensation values "T(101)+ΔT(101)" 722, "T(101)−ΔT(101)" 724, "T(011)+ΔT(011)" 726, "T(011)−ΔT(011)" 728, "T(111)+ΔT(111)" 730, and "T(111)−ΔT(111)" 732. Then, the recording compensation value is stored so as to be associated with corresponding polarities (polarity pattern) of the pattern.

In this way, a difference between recording compensation values of opposite polarities are calculated from an average of recording compensation values (for example, T(101), T(011), and T(111)), which is used in a known technique. This facilitates adjustment of recording compensation values.

System Configuration:

The components of the magnetic disk device 1 illustrated in FIG. 2 are functional and conceptual, and the components are not necessarily physically configured as in the illustration. That is, specific configurations of distribution and integration of the magnetic disk device 1 are not limited to the configuration illustrated in the drawings. All or some of the configurations can be functionally and physically distributed and integrated in an arbitrary unit in accordance with various loads and usage statuses. For example, a memory and a non-volatile memory may be integrated into one storage unit.

Further, all or arbitrary parts of processing functions may be realized as a program to be analyzed and executed by an MPU (microprocessing unit), an MCU, or a CPU (central processing unit), or as hardware based on wired logic. For example, various processing described in the above embodiments may be performed by a control device or the like having an MPU, an MCU, or a CPU executing a recording compensation program.

According to the present technique, in order to correct NLTS which occurs in magnetic recording and is dependent on recording polarities, recording compensation is performed taking into account the recording polarities. This realizes a storage device capable of highly reliable operation with high recording density and high-speed transmission.

What is claimed is:

1. A storage apparatus comprising:
    a storage for storing a plurality of compensation values in association with a plurality of bit sequence patterns, respectively, the compensation values each obtained by adding or subtracting a difference between recording compensation values of opposite polarities corresponding to a pattern causing nonlinearity to or from an average value of recording compensation values corresponding to the pattern causing nonlinearity;
    a head for writing data into a medium; and
    a controller for controlling the apparatus and driving the head, the controller determining whether to use one of the compensation values to drive the head to write an instantaneous data bit in dependence upon the immediate preceding data bits in reference to the bit sequence patterns.

2. The storage apparatus of claim 1, wherein the controller changes data bit length on the basis of the one of the compensation values when writing the instantaneous data bit.

3. The storage apparatus of claim 2, wherein the storage stores signed NRZI patterns in association with the compensation value.

4. The storage apparatus of claim 3, wherein the controller compensates the data with the signed NRZI pattern.

5. A controller for controlling a head for writing data into a medium, comprising:
    a storage for storing a plurality of compensation values in association with a plurality of bit sequence patterns, the compensation values each obtained by adding or subtracting a difference between recording compensation values of opposite polarities corresponding to a pattern causing nonlinearity to or from an average value of recording compensation values corresponding to the pattern causing nonlinearity; and
    a compensation unit for determining whether to use one of the compensation values to drive the head to write an instantaneous data bit independence upon the immediate preceding data bits in reference to the bit sequence patterns.

6. The controller of claim 5, wherein the compensation unit changes data bit length on the basis of the one of the compensation values when writing the instantaneous data bit.

7. The controller of claim 6, wherein the storage stores signed NRZI patterns in association with the compensation value.

8. The controller of claim 7, wherein the compensation unit compensates the data with the signed NRZI pattern.

9. A method of controlling apparatus having a medium for storing data and a head for writing data into the medium, comprising:
    storing a plurality of compensation values in association with a plurality of bit sequence patterns, the compensation values each obtained by adding or subtracting a difference between recording compensation values of opposite polarities corresponding to a pattern causing nonlinearity to or from an average value of recording compensation values corresponding to the pattern causing nonlinearity; and
    determining whether to use one of the compensation values to drive the head to write an instantaneous data bit in dependence upon the immediate preceding data bits in reference to the bit sequence patterns.

10. The method of claim 9, further comprising changing data bit length on the basis of the one of the compensation values when writing the instantaneous data bit.

11. The method of claim 10, wherein the storing stores signed NRZI patterns in association with the compensation value.

12. The method of claim 11, wherein the compensating compensates the data with the signed NRZI pattern.

* * * * *